Patented Oct. 30, 1951

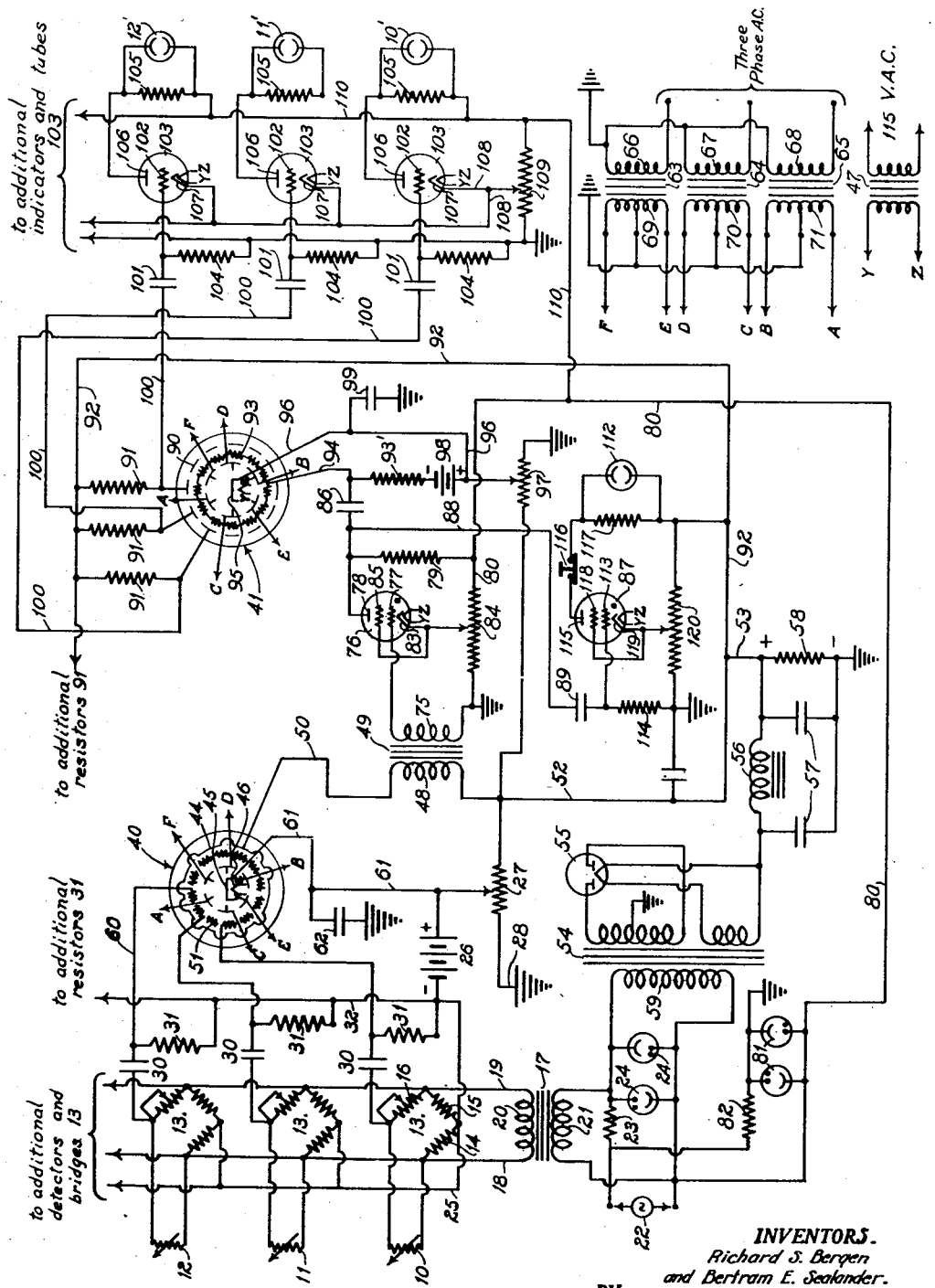

2,573,175

UNITED STATES PATENT OFFICE 2,573,175

ELECTRONIC SIGNALING SYSTEM

Richard S. Bergen, Westbury, N. Y., and Bertram E. Sealander, Jersey City, N. J., assignors to Republic Aviation Corporation, Farmingdale, N. Y., a corporation of Delaware Application September 4, 1948, Serial No. 47,884

6 Claims. (Cl. 177—311)

This invention relates to electronic signalling systems and more particularly concerns a method and apparatus for the transmission of measurements from each of a plurality of individual stations to a central station or point for indication or recordation.

More particularly this invention concerns a method and apparatus for sequentially indicating or recording measurements of physical or electrical conditions made at each of a number of points or secondary stations and transmitted to a central point or primary station and has as one of its purposes the production of a virtually continuous and simultaneous record or indication of variations occurring at each such secondary station. It also provides means whereby a high degree of sensitivity to variations of the conditions may be achieved while at the same time insuring accurate and positive indications of such variations even in the presence of relatively severe mechanical shock or voltage fluctuations.

An example of one of the many uses of this invention is in the detection of fire, smoke or even gas in mines, buildings, and aircraft and other vehicles and the like. In vehicular use, and particularly in connection with aircraft, it can provide the pilot or other occupant with practically instantaneous and accurate information of the existence of a fire at any point in the aircraft at which a fire detector or pick-up constituting part of the equipment may be located. Since the equipment is free from vibrational effects or voltage changes ordinarily experienced in aircraft, it is possible to obtain any desired sensitivity without the possibility of incurring frequent false alarms or erroneous indications.

The above and other objects and advantages of this invention will become more apparent in the following description and from the drawing wherein is shown a schematic wiring diagram of one embodiment of the present invention.

Sequential signalling systems of conventional design usually employ electromechanical devices such as rotary switches, or the like, for connecting the pick-up detector or measuring instrument at each of the outlying or secondary stations to its indicator at the central point or primary station. In these systems, however, the speed of rotation of the switch is ordinarily the limiting factor with reference to the rapidity with which signals from the secondary stations may be transmitted to and be indicated at the central station with any degree of accuracy. Systems of this type are also subject to vibration because of the employment of mechanical or electro-mechanical devices thereby placing a limitation on the sensitivity attainable under certain conditions especially where weight and power consumption must be retained at a minimum as in aircraft.

The present signaling system, although of the sequential type, does not employ mechanical or electromechanical devices but accomplishes its ends by an entirely electronic process.

The scanning or switching speed, if it may be so called for convenience, is for all practical purposes limitless and provides at all times positive and accurate results. The system according to this invention is therefore not affected by shock, atmospheric pressure or temperature, and can be relied upon even under the most difficult operating conditions.

In the drawings, 10, 11 and 12 denote three temperature responsive elements such as for instance a relatively high resistance coil of nickel or iron wire the resistance of which varies with changes in temperature. This general type of detecting element is very satisfactory for use as a fire or temperature detector, although other types will serve as well and it will be evident that still other types of detectors may be used to measure other conditions such as electric currents and weather conditions at a variety of points with equal effectiveness.

Each of the detecting elements is connected in a Wheatstone bridge 13 consisting of a variable resistor 16, and fixed resistors 14 and 15. Each of these resistors and the detecting element are connected in series to form a closed circuit. Any number of detectors and bridges 13, of which only three have been illustrated, may be employed in a system, and each of the bridges is energized by a winding 20 of the transformer 17 and the leads 18 and 19 connecting corresponding opposite terminals of the bridges to each other and to the winding 20. The primary winding 21 of the transformer 17 is connected with a source of alternating current 22 through a series resistor 23. A pair of gas filled voltage regulator tubes 24 connected "back to back" across the source 22 and in series with the resistor 23 operate to control the voltage applied to the primary winding 21. Since the source of the voltage is of an alternating character, the tubes 24 are connected in opposition one to the other or "back to back" so that each of the negative and positive peaks of the voltage applied to the winding 21 are accurately and uniformly controlled.

The output voltage of the bridges 13 is obtained across the vertically (as shown in drawing) disposed terminals. This voltage varies in accordance with changes in resistance of its associated detectors such as the elements 10, 11, 12, etc. The adjustable resistor 16 can be varied to alter the position of said voltage change relative to a given or assumed ground potential, as for instance with one adjustment of the resistor 16 a given change in the detecting element may change the output voltage from a normal value of 2 volts to a new value of 3 volts. By changing the adjustment of resistor 16 the normal value may be 3 volts and the new value caused by the detecting element would then be 4 volts. Thus, the temperature value or other condition that will trigger the apparatus to transmit a signal to the central station can be varied by the adjustment of the variable resistor 16.

The Wheatstone bridge is also desirable in the present system as it operates to convert changes in resistance of the detecting element into changes in voltage.

In the particular embodiment shown the lower output terminals of the bridges 13 are connected together by means of the wire 25 which in turn is connected to ground through the battery 26, part of the potentiometer 27 and the ground wire 28. The other output terminal of each bridge is connected to an individual condenser 30. Individual resistors 31 connect the other side of each condenser 30 to the lead 25 by means of the lead 32.

Switching means are illustrated schematically at 40 and 41 and are arranged to operate synchronously to sequentially connect each bridge 13 and its associated indicator, to be hereinafter described, to the intermediate circuits, which amplify and treat the signal voltages obtained from the bridges 13 to produce the desired indications. In short the switch 40 connects each bridge 13 in sequence to the intermediate circuits while the switch 41 similarly and simultaneously connects the respective indicators allocated to the bridges to said intermediate circuits, so that each bridge is repeatedly connected to its indicator in a given sequence. For a detailed description of the construction of a suitable electronic switch, reference is made to U. S. Patent No. 2,217,774 issued October 15, 1940, to Skellet. These switches are entirely electronic and include no moving mechanical parts.

The switching is accomplished by a rotating electron beam which cooperates successively with each of the plate-grid combinations whereby voltage signals in the grids will control the current in their associated plate circuits in much the same manner as in an ordinary radio tube. Should the plates of switching tube 40 be connected together it is apparent that the signals at each of the grids will successively control the current in the common plate circuit and conversely should the grids of switching tube 41 be connected together it is apparent that the voltage on the grids will successively control the current in each independent plate circuit.

More particularly the electronic switching tube 40 includes, in the particular form shown, a series of plates 44 arranged in a circle about the cathode 45 and this cathode is heated by a filament 46 having terminals Y and Z connected to corresponding terminals Y and Z on the transformer 47 supplying the heating voltage.

The plates 44 of the tube 40 are connected together to constitute in effect a common plate and this plate is connected to one side of the primary winding 48 of the transformer 49 by the lead 50. The other side of winding 48 is connected by leads 52 and 53 to the positive side of a direct current source comprising a conventional transformer 54, a full wave rectifying tube 55, a filter choke 56 and filter condensers 57. Since this circuit is conventional no further description is deemed necessary other than to point out that a D. C. voltage is developed across resistor 58 having the polarity as indicated in the drawing. The primary winding 59 of the transformer 54 is however connected in parallel with regulator tubes 24 and is energized by the alternating current source 22 through resistor 23 so that the voltage across the resistor 58 will remain constant with fluctuations in the source 22.

Between the plate 44 and the cathode 45 are the grids 51 each of which controls the current flow between the cathode 45 and the associated common plate 44 during the time the rotating electron beam passes the particular sector occupied by each grid. In this adaptation therefore each grid 51 successively controls the current in the lead 50, as the beam rotates. To effect this control each of the grids is connected by a lead 60 to a junction of one of the resistors 31 and condensers 30 in the output of the bridges 13 so that voltage variations in each of the detectors 10, 11, 12 etc. will correspondingly alter the voltage on its respective grid 51.

The remaining circuit of the tube 40 includes the lead 61 from the cathode 45 to the potentiometer 27. A bypass condenser 62 is connected between the lead 61 and ground so that the cathode will be at ground potential for alternating current frequencies produced by the bridges 13.

The potentiometer 27 is connected between the ground lead 28 and the high voltage lead 52 and is adjustable to control the value of the voltage applied to the plate 44 with respect to the cathode 45. The battery 26 is a grid bias battery and applies a fixed negative voltage to each of the grids 51 through their respective resistors 31.

With the circuits thus far described, it is apparent that with a given adjustment of each of the resistors 16 and the potentiometer 27 a given current will flow through the plate circuit of tube 40 which includes lead 50 and winding 48 of transformer 49. Since the output voltage of each bridge is of an alternating character it is also apparent that the plate current will also have an alternating component. Suppose now that one of the detectors, say detector 10, changes its value because of an increase in ambient temperature and assume that the associated bridge 13 is adjusted so that the voltage changes from minus 3 volts to minus 2 volts. Therefore, since the voltage on the associated grid 51 will now be less negative than it was before, more cathode beam electrons will pass through the grid to its associated plate 44 and for the time the beam is passing that particular plate and grid, an increase in plate voltage through the transformer winding 48 will result.

To produce rotation of the electron beam produced by the cathode 45 of the tube 40 a series of poles marked A to F inclusive are provided and are connected to correspondingly lettered terminals on transformers 63, 64, and 65. The primary windings 66, 67 and 68 of these transformers are Y connected to a three-phase source and the secondaries 69, 70 and 71 are connected to form a three-phase diametrically connected circuit. This voltage when applied to the tube 40 causes rotation of the beam in the manner previously discussed. The speed of rotation of the beam is determined by the frequency of the three-phase alternating current applied to the transformers 63, 64 and 65 and speeds of 5,000 C. P. S. and higher can easily be attained. With such speeds it is evident that scanning of several bridges 13 by rotation of the beam constitutes, for all practical purposes, continuous transmission of changes occurring at each detector 10, 11, 12, etc. to the transformer 49.

The indicating or amplifying circuit actuated by changes in current through the winding 48 of transformer 49 in response to changes in resistance of the detecting elements 10, 11, 12, etc., includes the secondary winding 75 and the thyratron tube 76. One side of the winding 75 is connected to ground and the other side of this winding is connected to grid 77 of the tube 76. The output or plate circuit of tube 76 includes the plate 78, resistor 79 and lead 80 to the regulator tubes 81. These tubes 81 are similar to the tubes 24 and are similarly connected through resistor 82 to the alternating current source 22. The other sides of the tubes 81 are each connected to ground. With this arrangement a regulated alternating voltage is applied to the plate 78 of the tube 76. The cathode 83 of the tube 76 is connected to the adjustable arm of the potentiometer 84 which in turn is connected between the lead 80 and ground. Adjustment of potentiometer 84 controls the voltage applied to the grid 77 with respect to the cathode 83. The remaining grid 85 in the tube 76 is connected directly to the cathode 83. The output of tube 76 is obtained from the lead connecting the plate 78 of that tube with the resistor 79 and is connected to the tube 41 through condenser 86 and to the tube 87 by means of lead 88 and condenser 89.

The operation of the thyratron tube 76 is well known in the art. It differs from an ordinary tube in that the plate current through resistor 79 has for all practical purposes two alternative values, a minimum value and a maximum value. Assuming that it is a minimum value and the grid 77 receives a voltage beyond a critical value, then the plate current will immediately increase to its maximum value and remain there until the voltage applied to the plate, such as through lead 80, is reduced to or below a zero value whereupon it will return to the minimum value, provided however that critical grid voltage is removed.

In this embodiment an alternating voltage is applied to the plate 78 so that it is alternately receiving a maximum positive voltage and then a maximum negative voltage. When an impulse or signal is produced in the winding 48 as previously described, a proportional signal will be induced into the secondary winding 75 and applied to the grid 77. This impulse or signal, assuming it is beyond the critical value for the tube 76, will cause the tube to draw its maximum plate current each time a maximum positive voltage is applied by the alternating current source 22. The moment this critical grid signal is removed, however, the tube 76 will draw its minimum plate current as soon as the plate voltage is reduced to or beyond zero value. In actual practice, however, the tube 76 is operable only during part of the time a positive voltage is applied to its plate since the tube requires a certain minimum positive plate voltage before it will operate at all.

As the electron beam in tube 40 is rotated, changes in any one or all of the detecting elements 10, 11, 12 etc. will actuate the tube 76 during the time the beam is passing the plate-grid sectors of tube 40. The action of tube 76 is extremely fast and with the rapidly rotating electron beams in tubes 40 and 41 it produces for all intents and purposes continuous indication of changes of all detecting elements.

The electronic switching tube 41 is similar in structure to the tube 40 and further description is not deemed necessary. The tube connections differ from those of tube 40 however, in that each of the plates 90 of tube 41 are connected through individual resistors 91 to the positive side of resistor 58 through lead 92, and the grids 93 are connected together and to condenser 86 by lead 94. The cathode circuit includes the cathode 95 and lead 96 to the potentiometer 97, the latter being connected between the high voltage lead 52, from resistor 58, to ground. Thus adjustment of the contact arm of the potentiometer 97 will determine the value of the voltage applied to the plates 90 with respect to the cathode 95. The grid circuit includes the grids 93, lead 94, a resistor 93' and a bias battery 98 to cathode lead 96. The voltage of battery 98 is adjusted so that the proper negative grid bias will be applied to the grids 93 of tube 41 for the desired operation thereof. The cathode 95 of this tube is by-passed to ground by means of a condenser 99 in the same manner as tube 40.

The electron beam in tube 41 is rotated by energizing the poles indicated by the letters A to F inclusive and these poles are connected as described in connection with tube 40 to the terminals A to F inclusive of transformers 63, 64 and 65.

Each of the plates 90 is connected by its individual lead 100 and condenser 101 to the grid 102 of its respective amplifying tube 103. A resistor 104 is connected between each of the grids 102 and ground to complete the individual grid circuits. The plate circuit of each tube 103 includes the plate 106, a resistor 105 in parallel with an indicator or lamp 10', 11', 12' etc. and the leads 110 and 80 to the regulator tubes 81. An alternating voltage is therefore applied to the plates 106 of each of the tubes 103.

The cathode circuit of each tube 103 consists of the cathode 107 and lead 108 to the center arm of the potentiometer 109, the latter being connected between the lead 110 and ground so that movement of the contact arm will alter the voltage on the grids of tubes 103 with respect to their cathodes.

As previously set forth, changes in resistance of the detecting elements 10, 11, 12 etc. produce voltage pulses or signals at the plate of the thyratron tube 76. These pulses are transmitted through condenser 86 to the grids 93 of the switching tube 41. Since the tubes 40 and 41 operate with their electron beams rotating in synchronism, a pulse, or series of pulses since the output from the bridges 13 is of an alternating character, produced by a detecting element 10, 11, 12, etc. will be transmitted to tube 41 each time its beam is in operative relation with one of its grids 93 corresponding to that detecting element. Should the detecting element 10, 11, 12 etc. be altered in value, for example by an ambient temperature change so as to pulse the thyratron tube 76, that pulse will be transmitted to the plate 90 of tube 41 associated with the grid corresponding with the grid 51 of tube 40 under control of the detecting element. The signal will then be transmitted by the associated plate lead 100 to condenser 101 and grid 102 of an associated amplifying tube 103.

The tubes 103 are amplifier tubes which increase the magnitude of pulses applied to the grids thereof. In the embodiment shown, each plate circuit of the tubes 103 includes a lamp or other indicator responsive to an increase in alternating plate current through an associated resistor 105. The pulses arriving at the grid 102 of a tube 103 associated with an indicator will therefore be reflected in the plate circuit of that tube as substantially larger pulses sufficient to operate the indicator.

Thus with each of the circuits properly adjusted, a given ambient temperature change at any one of the detecting elements 10, 11, 12, etc. will immediately operate its corresponding indicator 10', 11', 12', etc. The indicators illustrated are lamps of the gaseous type such as the conventional neon lamps and have been chosen because of the rapidity with which they respond to changes in plate current of the tubes 103. Other indicators would of course operate satisfactorily or recorders could be connected with the tubes 103 to provide a permanent record of the conditions measured by the detecting elements.

The particular circuit illustrated may employ alternating current sources of any desired operable frequency. For instance the source 22 may be 400 cycles per second and the three phase source feeding transformers 63, 64 and 65 may be 5,000 cycles per second. It is important that the sources be properly phased one with the other, and that the several parts of the circuit such as the bridges 13, thyratron 76 and amplifier tubes 103 are in phase one with the other. The frequency of the three phase A. C. source can also be made adjustable so that any desired scanning rate of the tubes 40 and 41 can be obtained.

In addition to the indicators 10', 11', 12' etc. associated with and corresponding to each of the detecting elements 10, 11, 12, etc. a master indicating light 112 is provided so that if one or more of the detecting elements undergo a change of resistance caused by a dangerously high temperature or other critical condition, the indicator 112 will illuminate and remain illuminated until manually reset or extinguished.

This system is particularly advantageous when used for fire detection in aircraft. In this instance one person, such as the flight engineer, may watch the several indicators 10', 11', 12', etc. and be able to locate the place in the aircraft where fire or even a dangerously high temperature may exist and the pilot or co-pilot is provided with the master indicator so he too will be immediately notified of the difficulty and can obtain further information from the flight engineer directly charged with fire protection duties. Upon extinguishment of the fire, the pilot upon being notified can reset and thereby extinguish his master lamp.

The master circuit includes the thyratron 87, the grid 113 of which is fed by the lead 88 and condenser 89. A grid resistor 114 is connected from the grid 113 to ground. The plate circuit includes the plate 115, normally closed, reset switch 116, plate resistor 117 with lamp 112 in parallel, and leads 92 and 53 to the positive side of resistor 58. The grid 118 and the cathode 119 are connected together and to the adjustable tap or resistor 120, the latter being connected between the high voltage direct current lead 92 and ground. The tap or resistor 120, as in the case of resistor 84, is set so that the desired voltage difference between the grid 118 and cathode 119 can be obtained.

Since thyratron tube 87 has a direct current voltage applied to its plate 115, once a pulse is applied to the grid 113 sufficient to trip the tube and cause it to draw the maximum current, the only way the tube can be reset is to momentarily interrupt the plate circuit. This is accomplished by the reset button or switch 116 in the plate circuit. Therefore should a signal from one of the detectors 10, 11, 12 etc. indicate presence of fire, the tube 87 will operate to illuminate the indicator 112. The indicator 112 will stay illuminated until the trouble has been corrected or remedied and the pilot or operator presses the reset button 116. If the reset button is operated while the abnormal or critical condition still exists the master indicator will again be effective upon release of button 116.

This invention provides a system wherein a plurality of detecting or secondary stations can be sequentially scanned to provide practically instantaneous individual indications from and for each detector. Since scanning speeds as high as 5,000 cycles per second and even higher can be employed, the indications as viewed by the eye are actually continuous. Moreover, by the elimination of all mechanical and electro-mechanical elements, a system is provided that is free from the effect of vibration which is a frequent source of false indications. This is especially true when used as fire detectors on aircraft. With the method of regulating the voltage applied to the several circuits, an extremely stable, highly sensitive, and dependable system is obtained.

Although the tubes 40 and 41 are illustrated with provision for only a limited number of detecting elements and indicators, it is understood that larger tubes or even duplicate sets can be arranged to operate in tandem to accommodate any number of detectors or indicators.

What is claimed is:

1. The central station of a signaling system comprising a pair of electronic tubes, one having a series of individual grids each adapted to be connected to a remote detector capable of initiating a signal in response to change in ambient conditions at the detector and a single plate common to all of said grids, and the other tube having a common grid and a series of individual plates each adapted to be connected to an indicator, each tube having means for producing and constantly rotating an electron beam synchonously with the beam of the other tube, intermediate electrical means for associating said tubes to transmit a signal resulting from change in ambient conditions at one of said detectors from the first tube to the second tube whereby the latter operates the indicator corresponding to the detector initiating the signal, and a master indicator circuit including an electronic tube and an indicating lamp connected with the output of the first tube aforesad whereby the lamp illuminates on the response of one or more of the detectors to changes in ambient conditions.

2. The central station of a signalling system comprising a pair of electronic tubes, one having a series of individual grids each adapted to be connected to a remote detector capable of initiating a signal in response to change in ambient conditions at the detector and a single plate common to all of said grids, and the other having a common grid and a series of individual plates each adapted to be connected to an indicator, said tubes each having means for producing and rotating an electron beam synchronously with the beam of the companion tube, intermediate electrical means for associating said tubes to transmit a signal resulting from a change in ambient conditions at one of said detectors from the first tube to the second tube whereby the latter operates the indicator corresponding to the detector initiating the signal, and a master indicator comprising a normally closed circuit including an electronic tube, an indicating lamp and manual switch electrically connected to the common plate of the first tube whereby the lamp illuminates when one of the detectors responds to a change in ambient conditions and will remain so illuminated until said switch is manually opened.

3. A fire detector system comprising a plurality of temperature responsive resistors located at separated stations, a Wheatstone bridge connected with each resistor, means for energizing said bridges for converting a change in resistance value of the resistors into a voltage change, an electronic circuit responsive to change in voltage, a first electronic scanning tube for sequentially connecting each bridge to said electronic circuit, a plurality of indicating lamps, an amplifying tube individual to and in electrical association with each lamp, a second electronic scanning tube operating in synchronism with said first scanning tube for sequentially connecting said electronic circuit to each amplifying tube and its associated indicating lamp, power sources for said tubes and circuit whereby a change in resistance value of one or more resistors will cause the lamp or lamps corresponding thereto to be illuminated, and a closed master circuit connected with the output of said first electronic tube including an indicating lamp and a reset switch whereby said lamp illuminates upon any change in value of one or more of said resistors and remains illuminated until manually extinguished by the operation of said reset switch.

4. A fire detecting system comprising a plurality of independent detectors each consisting of a temperature responsive resistor, a Wheatstone bridge connected with each detector, means whereby the energization of said bridges converts a change in resistance value of the resistors into a voltage change, an electronic circuit responsive to change in voltage, a first electronic scanning tube for sequentially connecting the bridges to said electronic circuit, a plurality of indicating lamps, a second electronic scanning tube operating in synchronism with said first scanning tube for sequentially connecting said indicating lamps to said electronic circuit, a power source of alternating current type for the bridges, the electronic circuit and the indicating lamps, whereby a change in resistance value of one or more resistors will illuminate the corresponding indicating lamp or lamps, a direct current power source for the operation of said scanning tubes, and a closed master circuit connected with the output of said first electronic tube including a master indicating lamp and a reset switch whereby said lamp illuminates upon any change in resistance value of one or more of said resistors and remains illuminated until manually extinguished by the operation of the reset switch.

5. A fire detecting system comprising a plurality of resistors each responsive to ambient temperature to alter the resistance value thereof, a Wheatstone bridge connected with each resistor, means for energizing said bridges to convert change in resistance value of the resistors to voltage change, an electronic circuit responsive to change in voltage and including the thyratron tube for amplifying signals corresponding to changes in voltage transmitted over said circuit, a first electronic scanning tube to sequentially connect the bridges to said electronic circuit, a plurality of indicating lamps, an amplifying tube individual to and in electrical association with each lamp, a second electronic scanning tube operating in synchronism with said first scanning tube for sequentially connecting each amplifying tube and its associated indicating lamp to said electronic circuit, power sources for said tubes and circuit whereby a change in resistance value of one or more resistors will illuminate the corresponding indicating lamp or lamps, and a closed master circuit connected with the output of the first electronic tube including a master indicating lamp, a reset switch and a thyratron tube whereby said master lamp illuminates upon any change in value of one or more resistors and remains illuminated until manually extinguished by opening said reset switch.

6. A fire detecting system consisting of a plurality of resistors, the resistance value of each resistor changing in response to ambient temperature fluctuations, an individual Wheatstone bridge for each resistor including the resistor as one of its legs, means whereby the energizing of said bridges converts changes in resistance value of said resistors into voltage changes, an electronic circuit responsive to voltage change and including a thyratron tube for amplifying the signals transmitted over that circuit, a first electronic scanning tube for sequentially connecting said bridges to said electronic circuit, a plurality of indicating lamps, a second electronic scanning tube operating in synchronism with said first scanning tube for sequentially connecting said indicating lamps to said electronic circuit, a closed master circuit connected with the output of the first electronic tube including a master indicating lamp, a reset switch and a thyratron tube whereby said master lamp illuminates upon any change in resistance value of one or more of said resistors and remains illuminated until manually extinguished by opening said reset switch, a power source of alternating current type for the bridges, electronic circuit, indicating lamps and master circuit, and a direct current power source for said scanning tubes.

RICHARD S. BERGEN.
BERTRAM E. SEALANDER.

REFERENCES CITED

The following references are of record in the file of this patent:

UNITED STATES PATENTS

| Number | Name | Date |
|---|---|---|
| 1,533,680 | Wiederhold | Apr. 14, 1925 |
| 1,965,393 | Schleicher et al. | July 3, 1934 |
| 2,068,116 | Sotter | Jan. 19, 1937 |
| 2,407,361 | Wilson | Sept. 10, 1946 |
| 2,444,950 | Nichols et al. | July 13, 1948 |
| 2,448,487 | Field et al. | Aug. 31, 1948 |

FOREIGN PATENTS

| Number | Country | Date |
|---|---|---|
| 502,711 | Great Britain | Mar. 23, 1939 |